United States Patent [19]

Mikan

[11] Patent Number: 4,825,157
[45] Date of Patent: Apr. 25, 1989

[54] HALL-EFFECT CONTROLLER

[76] Inventor: Peter J. Mikan, 31 Greenfield Rd., Milford, Conn. 06460

[21] Appl. No.: 194,141

[22] Filed: May 16, 1988

[51] Int. Cl.$^4$ .......................... G01B 7/14; G05G 9/00
[52] U.S. Cl. .............................. 324/208; 74/471 XY; 200/6 A; 307/309; 324/251; 338/32 H; 340/709
[58] Field of Search ................ 324/207, 208, 225, 251; 74/471 XY; 338/32 H; 307/309; 200/6 A, 52 R; 340/870.31, 870.32, 709; 361/179, 180

[56] References Cited

U.S. PATENT DOCUMENTS

| | | | |
|---|---|---|---|
| 1,834,405 | 12/1931 | Kosken | 369/50 |
| 1,985,044 | 12/1934 | Lyle | 177/346 |
| 3,622,898 | 11/1971 | Salmon | 324/251 X |
| 3,631,250 | 12/1971 | Van Buskirk | 250/205 |
| 3,649,840 | 3/1972 | Thorn et al. | 250/231 R |
| 3,809,910 | 5/1974 | Nellis | 250/561 |
| 3,872,301 | 3/1975 | Joppich | 250/205 |
| 4,085,296 | 4/1978 | Keegan | 179/100.3 R |
| 4,103,155 | 7/1978 | Clark | 250/231 SE |
| 4,161,726 | 7/1979 | Burson et al. | 340/365 R |
| 4,180,805 | 12/1979 | Burson | 340/709 |
| 4,284,885 | 8/1981 | Swensen | 250/211 K |
| 4,379,255 | 4/1983 | Klose et al. | 318/313 |
| 4,429,219 | 1/1984 | Yochum et al. | 250/229 |
| 4,434,412 | 2/1984 | Ruumpol | 336/134 |
| 4,514,600 | 4/1985 | Lentz | 200/5 R |
| 4,533,827 | 8/1985 | Fincher | 250/211 K |
| 4,554,451 | 11/1985 | Kirstein | 250/237 |
| 4,642,595 | 2/1987 | Ruumpol | 200/64 X |
| 4,731,530 | 3/1988 | Mikan | 250/229 |
| 4,733,214 | 3/1988 | Andresen | 324/208 X |

FOREIGN PATENT DOCUMENTS

| | | | |
|---|---|---|---|
| 729583 | 5/1980 | U.S.S.R. | |
| 1069673 | 5/1967 | United Kingdom | 324/208 |

Primary Examiner—Reinhard J. Eisenzopf
Assistant Examiner—Robert W. Mueller
Attorney, Agent, or Firm—H. Gibner Lehmann; K. Gibner Lehmann

[57] ABSTRACT

A Hall-effect control apparatus incorporating an actuator member having a magnetic core, and which is pivotally mounted on a base for movement in X-axis and Y-axis directions. An electrically energized coil excited with a. c. voltage produces a fluctuating magnetic field in the vicinity of the core. Four Hall-effect sensors are mounted on the base, and are arranged to sense changes in the a. c. field as the core member moves. The output of the Hall-effect sensors is both d. c. and a. c.; an electrical circuit connected therewith processes these voltages so as to cancel out any d. c. components thereof. The output of the electrical circuit in turn provides two voltages which are indicative of the X-axis and the Y-axis positions of the actuator member. The device is immune to interruption arising from d. c. fields, such as that of the earth; also significant immunity against error due to temperature fluctuations is realizable, as is immunity to error arising from aging of the various components. There is thus achieved improved accuracy and linearity as compared to the various devices of the prior art.

11 Claims, 2 Drawing Sheets

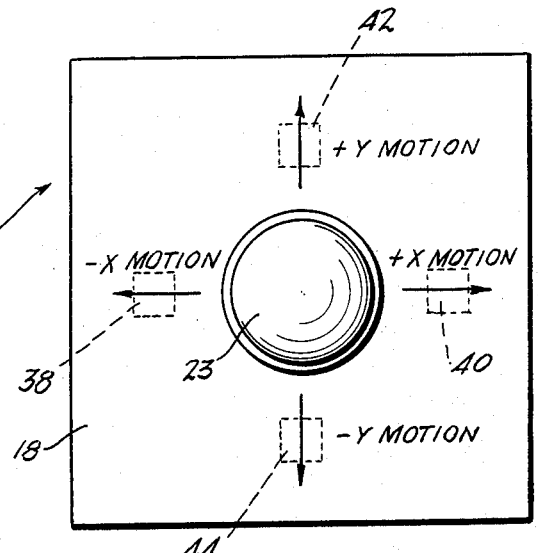
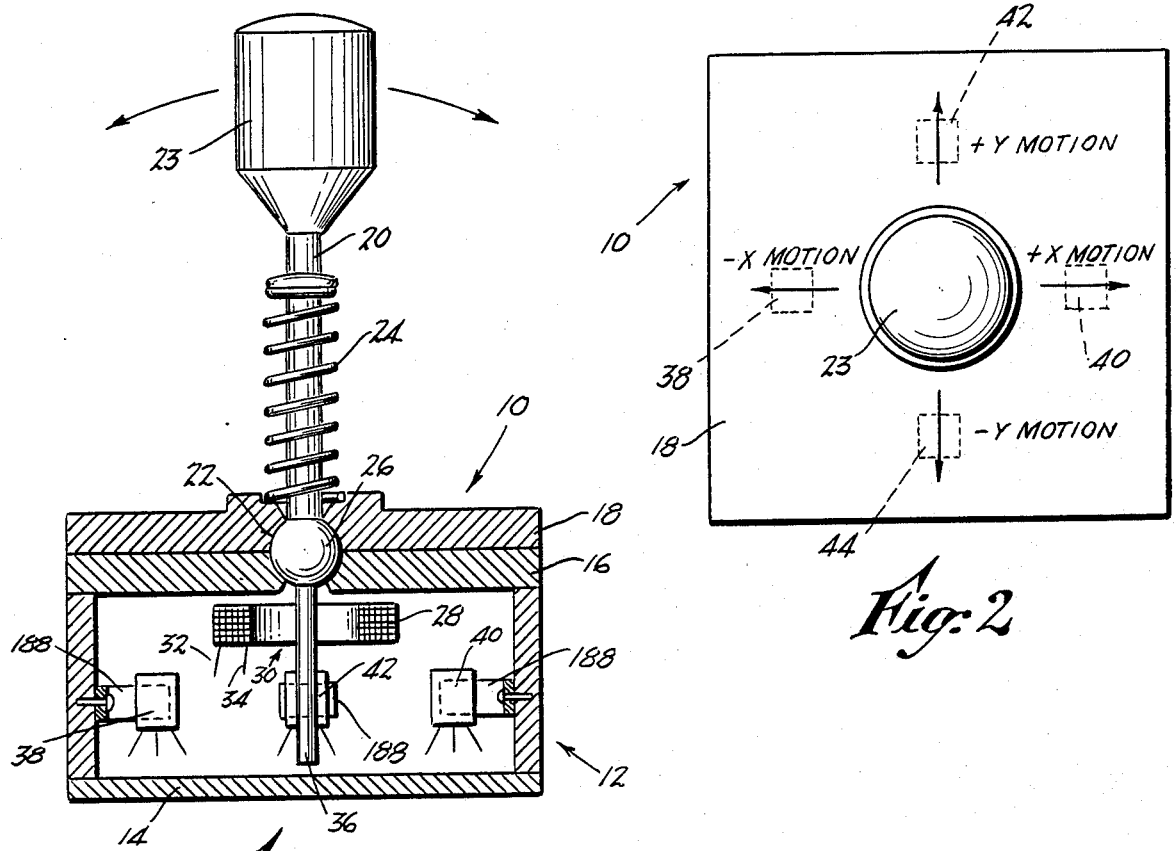
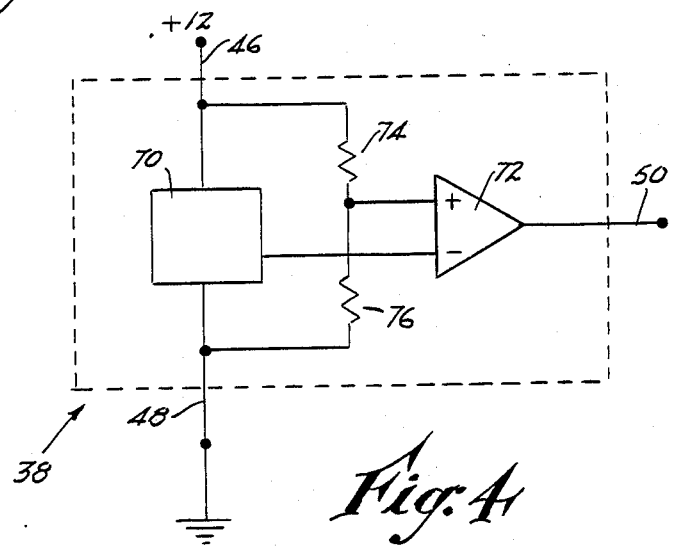

HALL-EFFECT CONTROLLER

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates to electronic control systems, and more particularly to devices of the type which convert mechanical movements into electrical signals.

2. Description of the Related Art Including Information Disclosed Under 37 CFR §§ 1.97-1.99

U.S. Pat. No. 4,434,412 issued Feb. 28, 1984, and entitled "Contactless, Electric Control-Handle" relates to a controller of the type commonly known as a "joystick", which is employed either in the field known as "robotics", or with computer terminals for governing the movement of a cursor on a video display screen. The device employs a handle and a core pivoted on a base. An energizing coil is provided and is fed with alternating current, which in turn produces a fluctuating electromagnetic field around the core.

Four pick-up coils are also provided, spaced about the periphery of the energizing coil. Movement of the core toward any one of the pick-up coils increases the magnetic coupling between the energizing coil and the respective pick-up coil, causing an increase in the voltage induced in that coil. By providing four pick-up coils spaced circumferentially 90° from one another, movement of the handle can be converted to two pairs of differential a.c. signals whose amplitudes can be correlated to the position of the handle in both the X-axis and Y-axis directions.

While the disclosed arrangement has utility for certain applications, it has been found that the cost is often prohibitive; in particular, in addition to the energizing coil, four individual pick-up coils are required; these are frequently bulky, consisting of many turns of very small gauge wire. The large number of turns is required in order to produce voltages of sufficient magnitude to be easily measureable. In addition, mounting of the four coils is difficult. If there existed any significant lack of symmetry between them, compensation was required so that a predetermined, precise "null" voltage could be obtained, corresponding to a neutral position of the handle and core. Such compensation was usually accomplished by adjusting the position of small core pieces associated with each of the pick-up coils.

With fine wire, connection to the coils was difficult because there was a tendency for the wire to break, particularly at the coil itself. Reattachment was often inconvenient or impossible.

Another disadvantage of the patented device was that it was subject to error due to temperature drift, aging, and external magnetic fields in the environment with which the device was used.

Efforts to eliminate both the energizing and the pick-up coils have been made, but have not met with any degree of success so far as I am aware.

In particular, the use of a permanent bar magnet as a core has been tried, with the energizing coil omitted. In addition, four Hall-effect transistors have been substituted in place of the four pick-up coils, respectively. This arrangement provided two pairs of d.c. outputs which varied according to the position of the handle.

However, this construction suffered serious drawbacks. There occurred drift due to aging of the permanent bar magnet and changes in temperature. A particularly troublesome problem also arose in the presence of external magnetic fields, even that of the earth. Since the Hall-effect sensors responded to any type of magnetic fields, the existence of stray fields caused erroneous readings. Even the presence of a piece of iron that was only moderately magnetized, defeated the operation of such controllers.

SUMMARY OF THE INVENTION

The above disadvantages and drawbacks of prior known controllers are obviated by the present invention which has for one object the provision of a novel and improved Hall-effect controller which is extremely simple and accurate, even over extended periods of time.

A related object of the invention is to provide an improved Hall-effect controller as above set forth, which is relatively immune to error due to the presence of external magnetic fields.

Still another object of the invention is to provide an improved Hall-effect controller as above characterized, which is largely immune to drift or errors resulting from changes in temperature.

A further object of the invention is to provide an improved Hall-effect controller in accordance with the foregoing, wherein the accuracy and linearity is superior to that of prior units, especially in the vicinity of the central or "null" position of the controller's handle or actuator member.

Yet another object of the invention is to provide an improved Hall-effect controller of the kind indicated, which is physically small, requires little adjustment, and which can be fabricated at a significantly reduced cost.

A still further object of the invention is to provide an improved Hall-effect controller as outlined above, which is both rugged and reliable, even in relatively harsh environments.

The above objects are accomplished by an improved Hall-effect type control apparatus comprising a base, a movable actuator member mounted on the base for tilting movement, and an electrically energized coil providing a fluctuating electromagnetic field at the base. The actuator member of the control has a magnetic core which is movable with respect to the coil and which alters the fluctuating field as the actuator member is moved. Four Hall-effect sensors on the base are positioned essentially 90° from one another, and each sensor detects a portion of the fluctuating field, to thereby provide a fluctuating electrical output whose amplitude varies as the core moves. An electronic circuit converts the fluctuating output signals received from the four Hall-effect sensors, to d.c. voltages, which in turn provide an indication of the position of the actuator member in both the X-axis and Y-axis directions.

The present improved controller has the advantage that precise results are obtained while at the same time no pick-up coils are required. In addition, immunity against temperature drift is greatly improved with respect to the devices of the prior art, since in the present electronic circuit such drift is nulled out or balanced, through the use of differential circuitry.

Also, an important feature of the invention is that the present improved device is highly immune to error from pick up of stray magnetic fields, since these are d.c. in nature, for the most part. While Hall-effect sensors respond to any type of magnetic field, in the present arrangement the effects of inadvertent or stray d.c. fields are cancelled out by the use of capacitive coupling at the inputs of those portions of the electronic circuitry which are fed by the output circuits of the Hall-effect sensors. The effects of stray a.c. fields are also minimized by a unique sample and hold configuration in the electronic circuitry.

Other features and advantages will hereinafter appear.

BRIEF DESCRIPTION OF THE DRAWINGS

FIG. 1 is a vertical section of a portion of the improved Hall-effect controller of the present invention, showing three of four Hall-effect sensors, an energizing coil, and a movable actuator member having a magnetic core.

FIG. 2 is a top plan view of the controller of FIG. 1.

FIG. 4 is a schematic circuit diagram of a typical integrated circuit Hall-effect sensor as employed with the controller of the present invention.

DESCRIPTION OF THE PREFERRED EMBODIMENT

Figure 3:
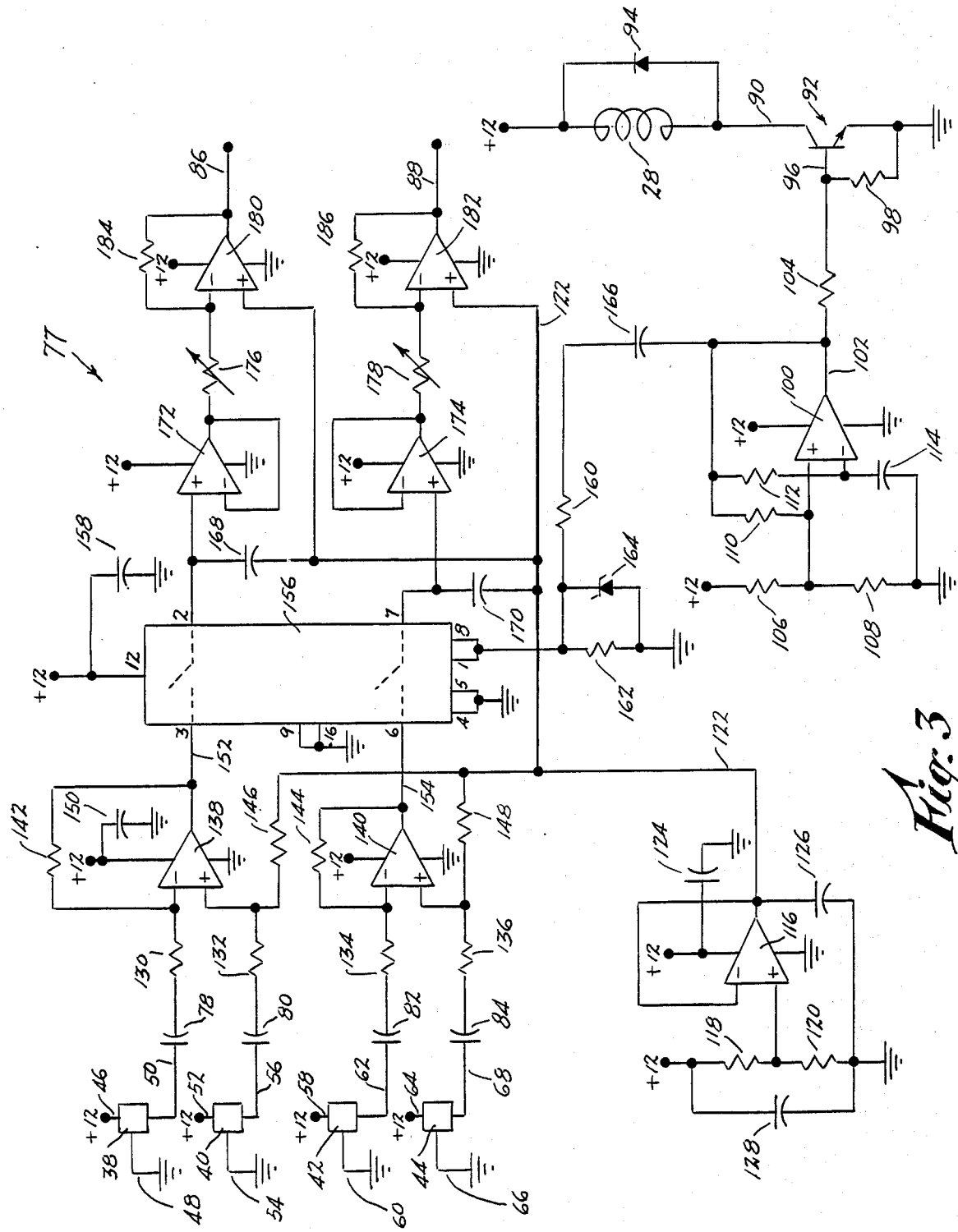
FIG. 3 is a schematic circuit diagram of four Hall-effect sensors employed with the controller of the invention, together with an electronic circuit thereof for processing signals received from the sensors.

By way of example, referring to the figures and in accordance with the present invention there is provided a novel and improved Hall-effect controller including an electronic circuit which produces d.c. output voltages that are indicative of the X-axis and/or Y-axis positions of an actuator member, such as the handle of a joystick or similar lever-operated device.

FIGS. 1 and 2 illustrate such a joystick generally designated by the numeral 10, comprising a housing 12 having a base 14, a cover 16 for the base 14, and a bearing plate 18 for mounting a handle or actuator member 20. The cover 16 and bearing plate 18 each have a central aperture which forms part of a socket 22. The handle 20 has a manually-engageable knob 23, return spring 24, and a ball 26 which is held captive in the socket 22. The spring 24 maintains the handle 20 in a normal vertical or neutral position with respect to the base 14.

By the present invention there is mounted in the base 14 an electrical energizing coil 28 of doughnut-like configuration, having a central opening 30 and electrical leads 32, 34. The handle or actuator member 20 has a magnetic core 36 which, in the illustrated embodiment, extends through the central opening 30 of the coil 28. The core 36 can be constituted of any suitable magnetic material, such as iron or steel, alloys thereof, ferrite, or equivalents.

Also by the invention, there are provided four Hall-effect sensors 38, 40, 42 and 44 adjustably mounted in the base 14, in positions such that they are subjected to the magnetic field provided by the energizing coil 28 and the magnetic core 36. The Hall-effect sensors constitute magnetic-sensitive detector means. Three sensors 38, 40 and 42 are shown in FIG. 1, whereas all four sensors 38, 40, 42 and 44 are shown in FIGS. 2 and 3.

The triple leads of the sensors 38, 40, 42 and 44 are labelled 46, 48 and 50; 52, 54 and 56; 58, 60 and 62; and 64, 66 and 68, respectively. These are illustrated in FIG. 3, but the numerical designations have been omitted from FIG. 1, for clarity.

A typical Hall-effect sensor 38 is shown in FIG. 4. The sensors 40, 42 and 44 are identical to each other, and to the sensor 38. In the present embodiment, the sensors 38, 40, 42 and 44 preferably take the form of integrated circuit packages each having three leads, such as those labelled 46, 48 and 50. The integrated circuit contains a Hall-effect semiconductor 70 and a follower stage 72 which amplifies the signal produced in the Hall-effect semiconductor 70. Biasing resistors 74 and 76 are associated with the amplifier 72. The integrated circuit packages are commercially available, being known as Hall Sensor Integrated Circuits, or Hall Sensors ICs, such as manufactured by Texas Instruments, under the part number TI 173.

By way of explanation, in the present case the Hall-effect sensors provide a predetermined output voltage, typically +6 volts d.c. with superimposed a.c. , when the actuator member 20 is in its central, or "null" position. This a.c. component of the output voltage varies with changes in magnetic flux, as determined by the relative positioning of the actuator member 20 with respect to the sensors.

By the invention, the magnetic flux generated in the energizing coil 28 is alternating or fluctuating. Correspondingly the magnetic flux sensed by each of the four Hall-effect sensors 38, 40, 42 and 44 is fluctuating, and as noted above the output of each Hall-effect sensor is typically characterized by a particular d.c. level with superimposed a.c. voltage.

In the electronic circuit 77 illustrated in FIG. 3, all d.c. components of the output signals of the Hall-effect sensors 38, 40, 42 and 44, namely those d.c. levels on lines 50, 56, 62 and 68, are completely blocked by series coupling capacitors 78, 80, 82 and 84, respectively. The provision of these series capacitors constitutes an important feature of the present invention, since they completely isolate these portions of the electronic circuit 77 which follow the capacitors 78, 80, 82 and 84, from the effects of d.c. magnetic fields sensed by the Hall-effect sensors 38, 40, 42 and 44 respectively. Such d.c. components would seriously interfere with readings of the position of the actuator member 20, and could in all likelihood render the device inoperative. Even the magnetic field of the earth, which for all practical purposes can be considered relatively stationary, or d. c., over the short term, is sufficiently strong to alter the d.c. components of the outputs of the Hall-effect sensors 38, 40, 42 and 44.

Further, in accordance with the invention the electronic circuit 77 processes the a.c. components of the outputs of the Hall-effect sensors 38, 40, 42 and 44, and converts them to a pair of d.c. voltages, one of the pair corresponding to the position of the actuator member 20 in an X-axis direction, and the other one of the pair corresponding to the position of the actuator member 20 in a Y-axis direction. These voltages appear on output terminals 86, 88 respectively.

Referring again particularly to the schematic diagram of FIG. 3, the various components of the circuit 77 are supplied with +12 volts d. c., as indicated by the terminals labelled "+12". These terminals are all connected together by a common line (not shown), hereinafter referred to as a positive supply line.

The energizing coil 28 is connected between the line supplying +12 volts and the collector 90 of a switching transistor 92. A protective diode 94 is connected across the coil 28, to suppress induced voltages which would otherwise be present when the coil 28 was excited by a pulsed voltage. The base 96 of transistor 92 has a biasing resistor 98 connected to its emitter and to ground.

Amplifier 100 is connected as a square wave generator, and produces pulses on line 102, at a frequency of 1000 Hz. These are in turn applied to the base 96 of transistor 92, through resistor 104. Associated with the square wave generator are resistors 106, 108, 110 and 112, and capacitor 114. The transistor 92 thus switches on and off at a rate of 1000 Hz, which applies a 1000 Hz pulse to the energizing coil 28. Current through the coil is approximately 20 mA a.c., and the applied pulse is actually in the form of a symmetrical square wave.

A reference voltage of typically +6.0 volts d.c. is provided by a second amplifier 116; the voltage applied to the non-inverting input is set by resistors 118 and 120. The amplifier 116 has 100% negative feedback, and its function is to provide a steady, regulated voltage on line 122; this line 122 thus constitutes a low-impedance, constant voltage supply line which provides +6 volts d.c. to the inputs of various other amplifiers, as will be described below. Capacitors 124, 126 and 128 are filters for reducing noise.

As shown in FIG. 3, two leads of each of the Hall-effect sensors are connected to the positive supply line and to ground, respectively. The third lead of each device is the output, these leads being labelled 50, 56, 62 and 68, respectively. As noted above, connected to each output is a series coupling capacitor 78, 80, 82 and 84, respectively which effectively blocks all d.c. components in the output signals. In series with capacitors are resistors 130, 132, 134 and 136 respectively, which in turn are connected respectively to the inverting input of a first amplifier 138; the non-inverting input thereof; the inverting input of a second amplifier 140; and the non-inverting input thereof. The voltage gain of amplifier 138 is determined by resistors 130 and 142, whereas the gain of amplifier 140 is set by resistors 134 and 144. Bias for the non-inverting input of amplifier 138 is obtained through resistor 146, which extends to the reference voltage line, +6 volts; similarly, bias for the non-inverting input of amplifier 140 is obtained through resistor 148. Capacitor 150 constitutes a filter, to reduce noise.

The outputs 152, 154 of amplifiers 138, 140 respectively are fed to two input terminals 3 and 6 of a quad analog switch 156. Only two of the four switches (shown dotted) in this device are employed in the present circuit. Capacitor 158 reduces noise on the supply line. Associated with the quad analog switch 156 are terminals labelled 1, 4, 5, 8, 9 and 16, as shown. The trigger input terminals 1 and 8 are fed from a divider string consisting of resistors 160 and 162. A Zener diode 164 provides protection against overvoltage, for the trigger input terminals 1 and 8 of the quad analog switch 156.

Resistor 160 in turn extends to a coupling capacitor 166, which is connected to the output 102 of the square wave generator 100. Capacitor 166 and resistors 160 and 162 thus constitute a differentiating circuit which converts the square wave at the output 102 of the generator 100 to short pulses, each typically having a length of 50 microseconds. These pulses are applied, at a frequency or pulse repetition rate of 1000 Hz, to the trigger input terminals 1 and 8 of the quad analog switch 156. The arrangement is such that the quad analog switch 156 conducts (i.e. connects input terminal 3 to output terminal 2, and connects input terminal 6 to output terminal 7) during the peak of the fluctuating signal at the outputs 152 and 154 of amplifiers 138 and 140, respectively; with the conductions thus provided by the quad analog switch 156 during such peaks, capacitors 168 and 170, connected to the two output terminals 2 and 7 respectively of the quad analog switch 156, charge up to the peak values of the waves at the outputs of the amplifiers 138 and 140 respectively. The quad analog switch 156 and the capacitors 168 and 170 (which latter are hereinafter referred to as comprising an output circuit), thus function as peak detectors or sample and hold circuits. The respective voltages across capacitors 168 and 170 are essentially d.c.

In effect, the quad analog switch 156 and capacitors 168, 170 function in the nature of rectifying circuits, which rectify the a.c. component of the waves at the output terminals 152 and 154 of amplifiers 138 and 140, respectively. The rectified waves are filtered by the capacitors 168 and 170 respectively.

An important feature of the invention is to reduce the effect of stray a.c. magnetic fields on the readings of the position of the actuator member 20. This is largely accomplished by triggering the analog switch 156 in synchronism with, or in phase with the a.c. components of the outputs of the Hall-effect sensors. The triggering of the analog switch occurs at a given phase point on the outputs of the Hall-effect sensors, and at the same point during each cycle. Thus, any stray a.c. field which does not have the exact same frequency and phase relationship with the 1000 Hz output from the square wave generator 100 will have difficulty in passing through the quad switch and will thus not adversely affect the d.c. levels on the capacitors 168 and 170. These d.c. levels ultimately determine the d.c. voltage readings on output terminals 86 and 88.

The d.c. voltages on terminals 2 and 7 are fed respectively into voltage follower amplifiers 172 and 174, respectively, each having a voltage gain of one. The outputs of these amplifiers 172 and 174, respectively are in turn connected, through variable resistors 176 and 178 respectively, to the inputs of additional, variable gain amplifiers 180 and 182, respectively; the gain of amplifier 180 is determined by resistors 184 and 176, whereas that of amplifier 182 is determined by resistors 186 and 178. The non-inverting input of each amplifier 180, 182 is connected to the reference line 122, which, as noted above, is maintained at +6 volts d.c. Setting the gains of amplifiers 180 and 182 is made by adjusting the variable resistors 176 and 178, respectively.

With the above arrangement, there is provided a pair of voltages at the output terminals 86 and 88, respectively of amplifiers 180 and 182. That appearing on the output terminal 86 of amplifier 180 is indicative of displacement of the actuator member 20 of FIG. 1 in the X-axis direction (FIG. 2), whereas that appearing on the output terminal 88 of amplifier 182 is indicative of the displacement of the actuator member 20 in the Y-axis direction.

Thus, the present arrangement achieves the desired result, namely obtaining two d.c. voltages on terminals 86 and 88 that are indicative of the X and Y positions respectively, with excellent accuracy, and freedom from error due to stray d.c. magnetic fields, or other errors as might arise from temperature drifts, aging of the components, or other forms of incidental interference.

This result is not obtainable with prior controllers wherein a bar magnet is carried on an actuator member, and wherein Hall-effect sensors are employed to sense the variation in the d.c. magnetic field as the member is moved. In such a situation, stray d.c. fields upset the readings. In addition, over time, the flux provided by the bar magnet weakens, also causing an upset in the readings.

By the present invention, the a.c. signal provided by the energizing coil 28 is relatively constant with time; temperature variations appear as common-mode changes in the a.c. signal, and are balanced out by the provision of the differential amplifiers 138 and 140. All d.c. components in the outputs of the Hall-effect sensors are completely blocked by the series capacitors 78, 80, 82 and 84. Thus stray d.c. magnetic fields have absolutely no effect on the voltages applied to the first amplifiers 138 and 140. The voltages on the two non-inverting inputs of amplifiers 138 and 140 are characterized by a d.c. level determined by the d.c. voltage on the reference line 122, with a superimposed a.c. signal which depends on the amplitude of the signal received from the respective Hall-effect sensor 40, 44. The voltages on the two inverting inputs of amplifiers 138 and 140 are also characterized by a d.c. level with a superimposed a.c. signal received from the respective Hall effect sensor 38, 42.

Also, by the invention, initial adjustments in the positions of the Hall-effect sensors can be made in order to compensate for slight offsets which may occur. The adjustments can be made by frictionally mounting the Hall-effect sensors 38, 40, 42 and 44 on four small brackets 188 mounted on the inner surface of the base 14, and which permit movement of any or all of the Hall-effect sensors 38, 40, 42 and 44 toward or away from the core member 36; the initial adjustment is made when the latter is disposed at its center or neutral position, while observing the voltages on terminals 86 and 88 respectively, after which the sensors can be cemented in position.

Significantly improved linearity can be attained with the disclosed system. In actual tests performed on working models, linearity between the movement of the actuator member and the variation in output voltages on amplifiers 180 and 182 can be held to 5% or better, which was not achievable with many of the controllers previously known.

Amplifiers 138, 140, 180 and 182, while shown as separate, can be contained in a single package, known as a quad amplifier; a typical component type would be an LM 324, manufactured by National Semiconductor. Similarly, the four amplifiers 100, 116, 172 and 174 can be of this same type, contained in a single package. In such a case, the capacitor 150 provides filtering for the power supply for all four amplifiers 138, 140, 180 and 182, while the capacitor 124 provides filtering for the supply for the four amplifiers 110, 116, 172 and 174.

The quad analog switch can be a type LF 13331, also manufactured by National Semiconductor.

The device of the present invention as thus described is seen to represent a distinct advance and improvement in the technology of electromechanical controllers.

Variations and modifications are possible without departing from the spirit of the invention.

Each and every one of the appended claims defines an aspect of the invention which is separate and distinct from all others, and accordingly it is intended that each claim be treated as such when examined in the light of the prior art devices in any determination of novelty or validity.

What is claimed is:

1. A joystick control, comprising in combination:
    (a) a base,
    (b) a movable actuator member,
    (c) means pivotally mounting the actuator member for tilting movement on the base,
    (d) means providing a fluctuating electric field on the base,
    (e) said actuator member carrying a magnetic core movable with respect to said fluctuating electric field providing means, thereby to alter the said fluctuating electric field as the actuator member is moved,
    (f) a Hall-effect sensor rigid with respect to the base and disposed so as to be under the influence of said fluctuating electric field,
    (g) said Hall-effect sensor providing a fluctuating electrical output signal in response to fluctuations of said fluctuating electric field, and
    (h) electronic circuit means connected to said Hall-effect sensor, for converting the fluctuating output signal thereof to essentially a d.c. voltage which varies with changes in the position of the magnetic core carried by said actuator member.

2. A joystick control, comprising in combination:
    (a) a base,
    (b) a movable actuator member,
    (c) means pivotally mounting the actuator means for tilting movement on the base,
    (d) means providing a fluctuating electric field on the base,
    (e) said actuator member having a magnetic core movable with respect to said fluctuating electric field providing means, thereby to alter the fluctuating electric field as the actuator member is moved,
    (f) a pair of Hall-effect sensors rigid with respect to the base and providing a pair of fluctuating electrical output signals in response to fluctuations of said electric field,
    (g) electronic circuit means connected to said Hall-effect sensors, for blocking the d.c. component of the output signals therefrom, and for passing at least a portion of the a.c. components thereof, and
    (h) means for converting the a.c. components of the output signals of said Hall-effect sensors to d.c. voltages, whereby said d.c. voltages vary with changes in the position of the magnetic core with respect to said Hall-effect sensors.

3. The invention as set forth in claim 2, and further including:
    (a) an additional pair of Hall-effect sensors, said first-mentioned pair being circumferentially disposed essentially 180° apart from one another,
    (b) said additional pair of Hall-effect sensors being circumferentially disposed essentially 180° apart from one another, and 90° from said first pair of Hall-effect sensors.

4. The invention as set forth in claim 2, wherein:
    (a) said electronic circuit means comprises a series coupling capacitor which blocks d.c. voltage, and
    (b) said converting means comprising an amplifier and peak detector circuit, connected with said coupling capacitor, responsive to the peaks of the a.c. component of the signal passing through said coupling capacitor, said peak detector circuit providing an essentially d.c. signal at its output.

5. The invention as set forth in claim 4, wherein:
(a) said peak detector circuit comprises an analog switch, and
(b) a capacitor connected to the output of the analog switch, said capacitor being capable of being charged by the output of said analog switch, and holding the said charge.

6. The invention as set forth in claim 2, wherein:
(a) said means for providing a fluctuating electric field on the base comprises an electrical inductor, and
(b) a signal generator, connected with said inductor and adapted to provide a fluctuating flux therearound.

7. The invention as set forth in claim 6, wherein:
(a) said signal generator comprises a pulse generator.

8. The invention as set forth in claim 2, wherein:
(a) said electronic circuit means comprises an analog switch,
(b) means connecting the input of the analog switch to the output of one of said Hall-effect sensors,
(c) said means providing a fluctuating electric field comprising a pulse generator, and
(d) means interposed between said pulse generator and said analog switch, to trigger the latter into conduction in phase with the outputs from said Hall-effect sensors.

9. A joystick control, comprising in combination:
(a) an electrical coil and exciting means therefor, for producing a fluctuating magnetic field,
(b) a Hall-effect sensor adjacent said coil,
(c) a magnetic core for altering the fluctuating magnetic field sensed by the Hall-effect sensor,
(d) said magnetic core and coil being movable with respect to one another, and
(e) electronic circuit means connected with said Hall-effect sensor, for converting the output of the sensor to an essentially d.c. voltage which varies with the relative positions of the core and coil.

10. A control apparatus, comprising in combination:
(a) means for producing a fluctuating magnetic field,
(b) magnetic detector means under the influence of said field-producing means, said magnetic detector means having an output wave corresponding to the strength of said magnetic field,
(c) switching means connected with said field-producing means and said detector means, and
(d) means for triggering said switching means into conduction at a predetermined point in the phase of each cycle in the output wave of the magnetic detector means,
(e) said switching means providing a d.c. voltage which can be correlated to the magnitude of the said output wave at the said predetermined point.

11. A joystick control, comprising in combination:
(a) a pivotal magnetic member having a fluctuating flux,
(b) a Hall-effect sensor adjacent said member and influenced by the flux thereof,
(c) connecting circuitry including a blocking capacitor connected to said Hall-effect sensor, producing from the signal thereof a fluctuating wave,
(d) electronic switching means connected to said connecting circuitry,
(e) an output circuit, and
(f) means synchronized with the flux of the magnetic member, controlling said switching means to drive said output circuit with the fluctuating wave from the connecting circuitry.

* * * * *